United States Patent
Tseng

(10) Patent No.: US 9,028,124 B2
(45) Date of Patent: May 12, 2015

(54) LIGHT GUIDE PLATE AND BACKLIGHT MODULE INCLUDING SAME

(71) Applicant: Hon Hai Precision Industry Co., Ltd., New Taipei (TW)

(72) Inventor: Yung-Chang Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/792,164

(22) Filed: Mar. 10, 2013

(65) Prior Publication Data

US 2014/0211501 A1  Jul. 31, 2014

(30) Foreign Application Priority Data

Jan. 20, 2013  (TW) ................... 102103219

(51) Int. Cl.
*F21V 7/04* (2006.01)
*F21V 8/00* (2006.01)

(52) U.S. Cl.
CPC .................................. *G02B 6/0016* (2013.01)

(58) Field of Classification Search
USPC ................... 349/65; 362/608, 613, 625, 626; 385/146, 901

See application file for complete search history.

(56) References Cited

U.S. PATENT DOCUMENTS

2007/0159848 A1*  7/2007  Yang et al. ............. 362/608
2008/0123364 A1*  5/2008  Chang et al. ............ 362/608

* cited by examiner

*Primary Examiner* — Stephen F Husar
(74) *Attorney, Agent, or Firm* — Novak Druce Connolly Bove + Quigg LLP

(57) ABSTRACT

A backlight module includes a light guide plate and a number of light sources. The light guide plate includes a frosted light incident surface, diffusion structures positioned on the frosted light incident surface, and dot-shaped micro-recesses positioned on the diffusion structures. The light sources face the frosted light incident surface.

12 Claims, 4 Drawing Sheets

LIGHT GUIDE PLATE AND BACKLIGHT MODULE INCLUDING SAME

BACKGROUND

1. Technical Field

The present disclosure relates to a backlight module and a light guide plate used in the backlight module.

2. Description of Related Art

A light guide plate usually includes a light mixing area and an illuminating area adjacent to each other. Light emitted from light sources reaches the light mixing area first, mix in the light mixing area, and thus can be evenly distributed when reaching the illuminating area. Yet, the total width of the light guide plate is large due to the light mixing area.

Therefore, it is desirable to provide a light guide plate and a backlight module which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
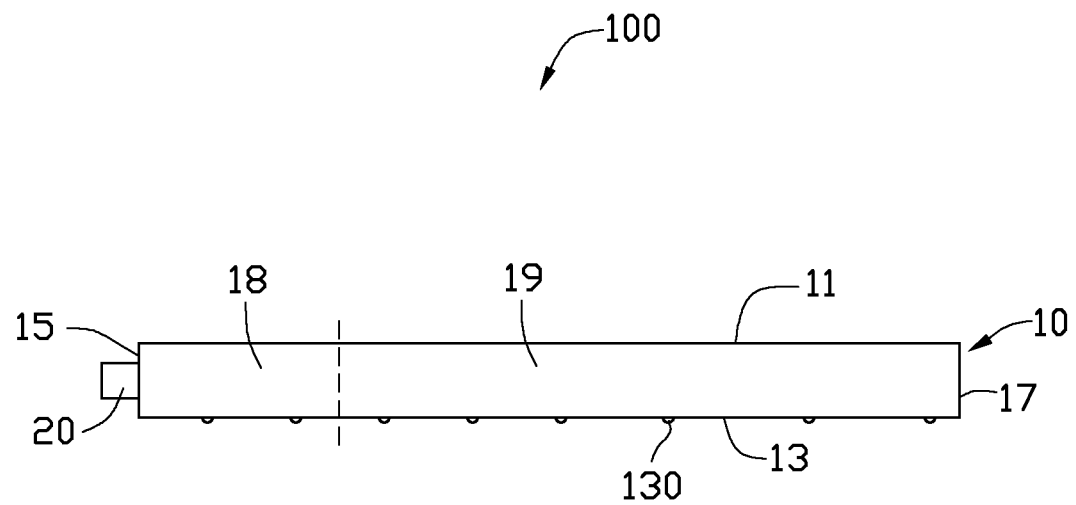
FIG. 1 is a schematic, side view of a backlight module according to a first embodiment of the present disclosure, the backlight module including a light guide plate.
Figure 2:
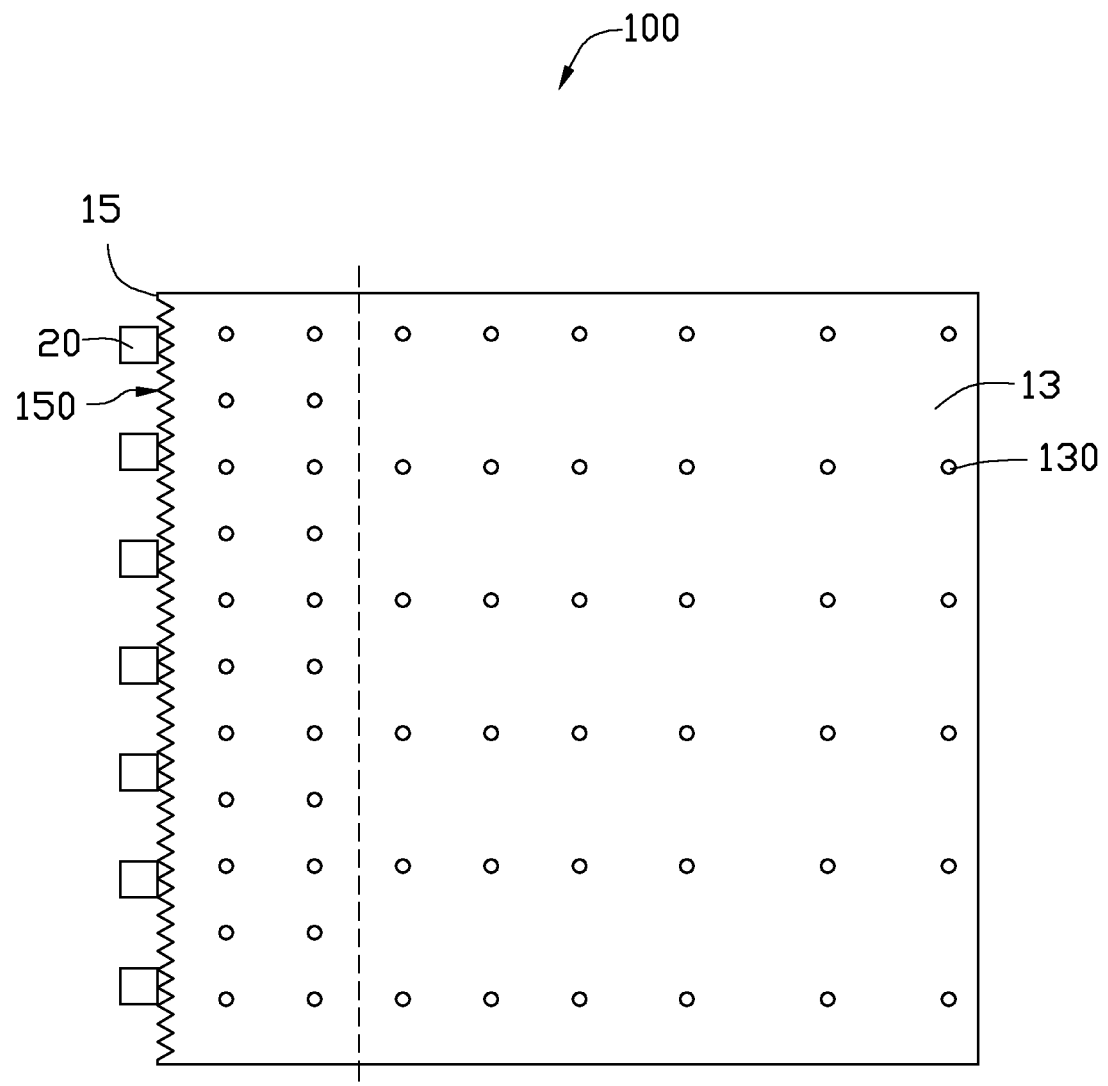
FIG. 2 is a bottom view of the backlight module of FIG. 1.

Referring to FIGS. 1 and 2, a backlight module 100 according to a first embodiment, is disclosed. The backlight module 100 includes a light guide plate 10 and a plurality of light sources 20.

The light guide plate 10 is substantially rectangular, and includes a light emitting surface 11, a bottom surface 13 opposite to the light emitting surface 11, a light incident surface 15 connecting to the light emitting surface 11 and the bottom surface 13, and a side surface 17 opposite to the light incident surface 15. The light sources 20 are spaced to each other and face the light incident surface 15. In this embodiment, the light sources 20 are light emitting diodes.

The light guide plate 10 is divided into a light mixing area 18 adjacent to the light sources 20 and an illuminating area 19 far away from the light sources 20 relative to the light mixing area 18. Light emitted from the light source 20 is introduced into the light guide plate 10 from the light incident surface 15 and is transmitted towards the side surface 17. The light mixes in the light mixing area 18 and is evenly distributed when reaching the illuminating area 19.

Dot-shaped domes 130 are formed on the bottom surface 13 of the light guide plate 10. The dot-shaped domes 130 are used to change the transmitting direction of the light and make the light emit from the light emitting surface 11.

Figure 3:
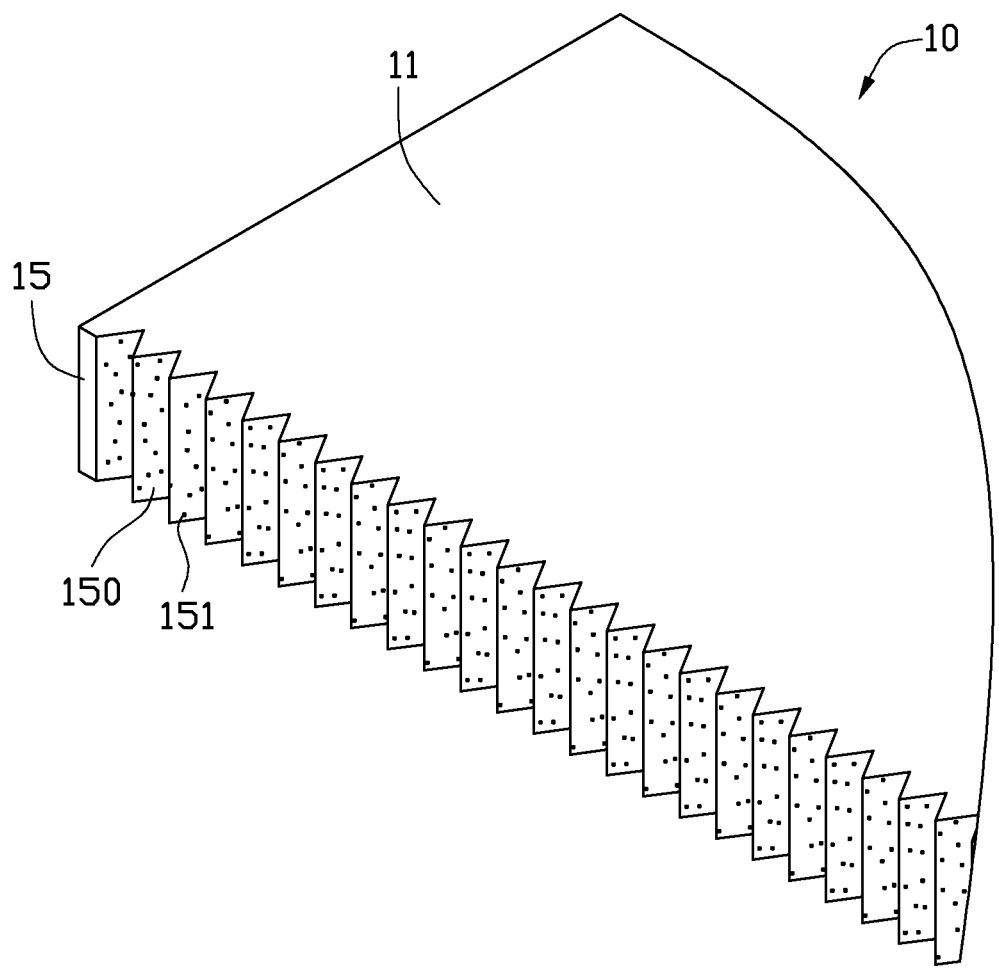
FIG. 3 is a schematic, isometric and partial view of the light guide plate of FIG. 1.

Referring to FIG. 3, in order to reduce the width of the light mixing area 18, diffusion structures 150 are formed on the light incident surface 15. In this embodiment, the diffusion structures 150 are V-shaped strips parallel to each other. An extending direction of each V-shaped strip 150 is perpendicular to the light emitting surface 11. The diffusion structures 150 diffuse light emitted from the light sources 20 to the area between each two adjacent light sources 20.

For further reducing the width of the light mixing area 18, the light incident surface 15 is frosted by means of sand-blasting, and defines a plurality of random distributed dot-shaped micro-recesses 151. The dot-shaped micro-recesses 151 are positioned on the diffusion structures 150. A surface roughness of the light incident surface 15 is in a range from about 0.5 microns to about 0.7 microns. The greater the surface roughness of the light incident surface 15, the greater the distribution density of the dot-shaped micro-recesses 151. The dot-shaped micro-recesses 151 scatter the light to different directions to make the light be evenly distributed, thus help reduce the width of the light mixing area 18.

Figure 4:
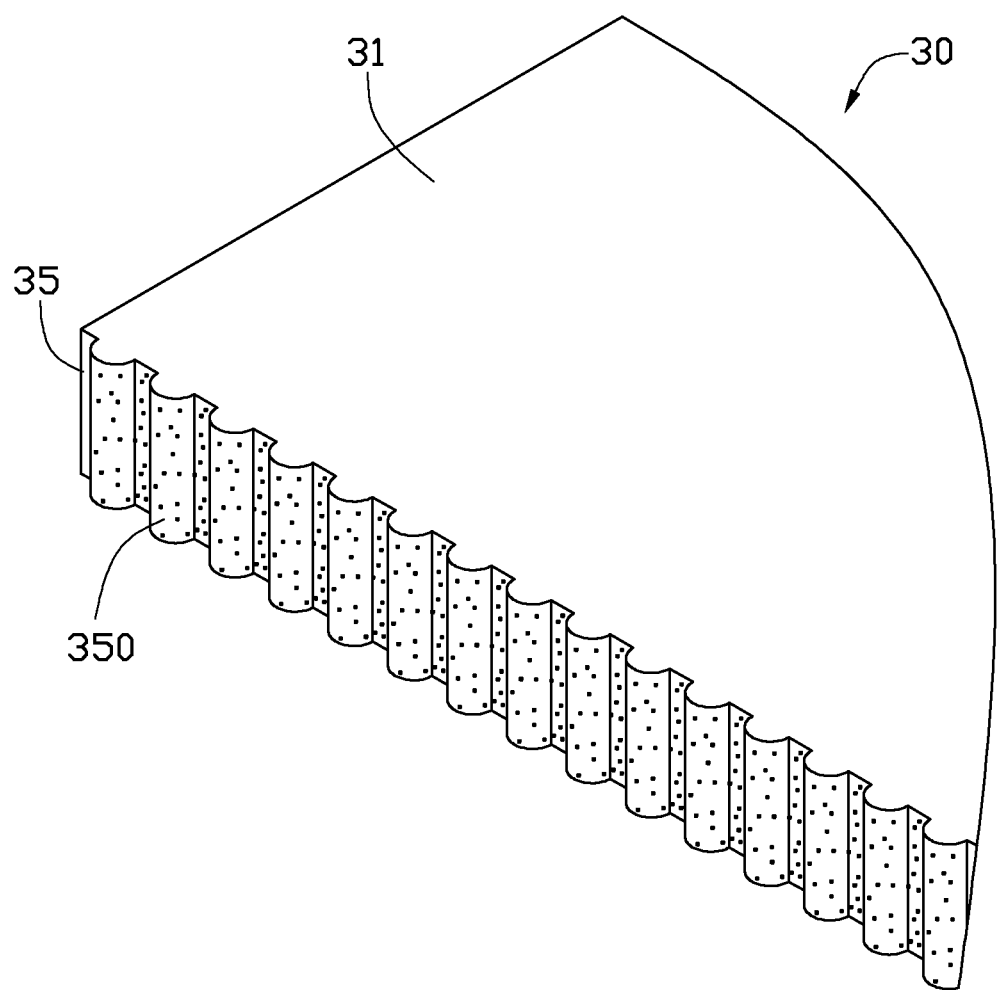
FIG. 4 is a schematic, isometric partial view of a light guide plate according to a second embodiment of the present disclosure.

Referring to FIG. 4, a light guide plate 30 according to a second embodiment is disclosed. The light guide plate 30 is similar to the light guide 10 of the first embodiment, except that diffusion structures 350 on a light incident surface 35 of the light guide plate 30 are semi-cylindrical strip. The semi-cylindrical strips 350 are spaced and parallel to each other. An extending direction of each semi-cylindrical strip 350 is perpendicular to a light emitting surface 31 of the light guide plate 30.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A backlight module comprising:
    a light guide plate comprising:
        a frosted light incident surface;
        a plurality of diffusion structures positioned on the frosted light incident surface; and
        a plurality of dot-shaped micro-recesses positioned on the diffusion structures; and
    a plurality of light sources facing the frosted light incident surface.

2. The backlight module of claim 1, wherein the dot-shaped micro-recesses are random distributed.

3. The backlight module of claim 1, wherein the diffusion structures are V-shaped strips parallel to each other.

4. The backlight module of claim 1, wherein the diffusion structures are semi-cylindrical shaped strips spaced and parallel to each other.

5. The backlight module of claim 1, wherein the frosted light incident surface is processed by means of sand-blasting.

6. The backlight module of claim 1, wherein a surface roughness of the frosted light incident surface is in a range from about 0.5 micros to about 0.7 microns.

7. A light guide plate comprising:
    a frosted light incident surface;
    a plurality of diffusion structures positioned on the frosted light incident surface; and
    a plurality of dot-shaped micro-recesses positioned on the diffusion structures.

8. The light guide plate of claim 7, wherein the dot-shaped micro-recesses are random distributed.

9. The light guide plate of claim 7, wherein the diffusion structures are V-shaped strips parallel to each other.

10. The light guide plate of claim 7, wherein the diffusion structures are semi-cylindrical shaped strips spaced and parallel to each other.

11. The light guide plate of claim 7, wherein the frosted light incident surface is processed by means of sand-blasting.

12. The light guide plate of claim 7, wherein a surface roughness of the frosted light incident surface is in a range from about 0.5 micros to about 0.7 microns.

* * * * *